H. C. HAYES & G. W. LEWIS.
EXTENSOMETER.
APPLICATION FILED OCT. 11, 1915.
1,279,340.
Patented Sept. 17, 1918.
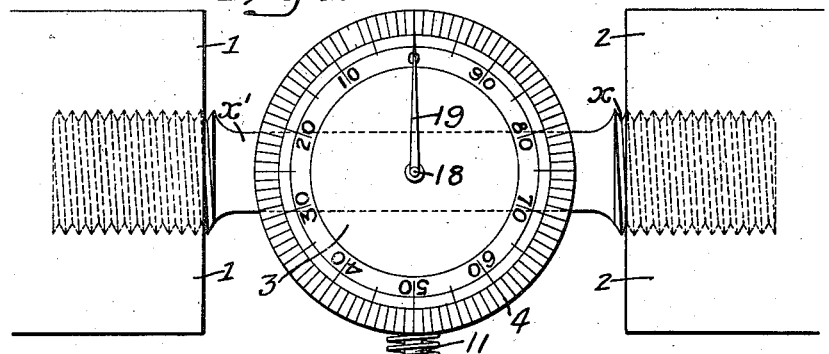
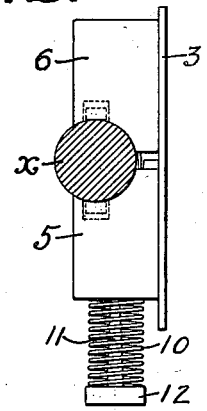
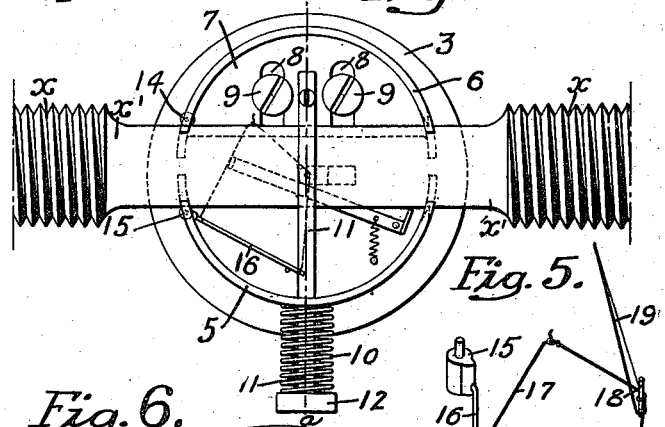
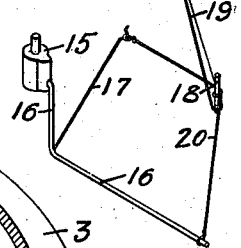
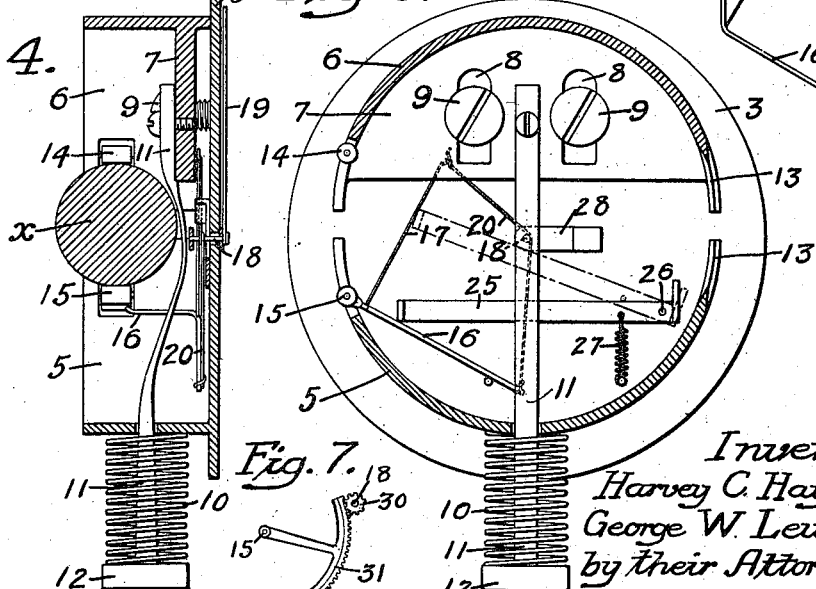
Inventor
Harvey C. Hayes
George W. Lewis
by their Attorneys
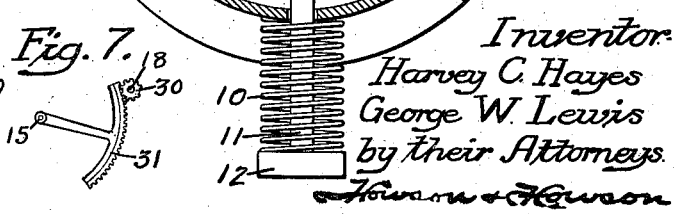

UNITED STATES PATENT OFFICE.

HARVEY C. HAYES AND GEORGE W. LEWIS, OF SWARTHMORE, PENNSYLVANIA, ASSIGNORS TO THE TINIUS OLSEN TESTING MACHINE COMPANY, OF PHILADELPHIA, PENNSYLVANIA, A CORPORATION OF PENNSYLVANIA.

EXTENSOMETER.

1,279,340.

Specification of Letters Patent.  Patented Sept. 17, 1918.

Application filed October 11, 1915.  Serial No. 55,258.

*To all whom it may concern:*

Be it known that we, HARVEY C. HAYES and GEORGE W. LEWIS, citizens of the United States, and residents of Swarthmore, Delaware county, Pennsylvania, have invented certain Improvements in Extensometers, of which the following is a specification.

One object of this invention is to provide a device which may be quickly and easily attached to a specimen under test to measure or indicate its elongation within its elastic limit as well as its yielding point, the invention contemplating a device including an indicator or pointer whose movement shall be substantially proportional to the elongation of a piece under test.

It is further desired to provide a relatively simple portable and inexpensive device for indicating or measuring the movement of one part of a body under test relative to another part thereof, the arrangement of parts being such that the device itself may be conveniently applied to or removed from a specimen.

Our invention also contemplates a device of the character described which will automatically adapt itself to operatively engage test pieces of widely varying dimensions and which shall be practical and convenient to use.

These objects and other advantageous ends we secure as hereinafter set forth, reference being had to the accompanying drawings, in which:

Figure 1 is a front elevation illustrating our invention as applied to a specimen under test;

Figs. 2 and 3 are respectively a side and a rear elevation of the apparatus shown in Fig. 1;

Fig. 4 is a vertical section, on an enlarged scale, taken on the line *a—a*, Fig. 3;

Fig. 5 is a perspective view illustrating the connection between the operating roller and the indicator needle;

Fig. 6 is a section on an enlarged scale illustrating the detail construction of the two sets of holding jaws; and Fig. 7 is a plan of another form of connection between the jaw carried roller and the indicator needle.

In the above drawings 1—1 and 2—2 represent two pairs of jaws of a testing machine designed to apply tension to a test specimen $x$ which in the present instance is shown as formed with a part X' of reduced and predetermined cross section. For indicating the behavior of this piece under test, we provide a plate in the form of a disk 3 whose front face is provided with radial graduations constituting a scale 4 of any desired units.

Fixed to the back face of this disk is a semi-annular piece 5 whose ends have concave and preferably circularly curved recesses, while a second semi-annular piece 6 is movably mounted on the rear face of this disk so as to bodily slide toward and from the fixed piece 5. For this purpose it has fixed to or integral with it a segmental plate 7 provided with slots 8 through which extend screws 9 threaded into the disk 3, the arrangement being such that the piece 6 is slidable in a plane parallel to the disk 3 toward and from the piece 5. Said piece 6 is of such shape that when its ends are in engagement with the ends of the piece 5, it forms therewith a complete ring and its ends are likewise provided with curved recesses which with the similar recesses in the ends of the piece 5, permit the passage between said pieces of a test specimen. The piece 6 is at all times drawn toward the piece 5 by means of a spring 10 operative on a bar 11, one end of which is fastened to the plate 7 while its opposite end passes through an opening in the piece 5, the spring being confined between the latter piece and a head 12 on said bar.

For gripping and holding the apparatus to a test specimen, one pair of the adjacent ends of the two pieces 5 and 6 constitute gripping jaws and have the edges of their recesses made relatively sharp to form knife edges as indicated at 13, Fig. 6. The edges of the recesses formed in the second pair of the adjacent ends of the members 6 and 7 have mounted adjacent their central and opposite portions two small rollers 14 and 15 designed to freely turn to permit of the passage through them of the test piece.

With such a construction of parts a test specimen engaged by the members 5 and 6 would be held from movement relatively thereto by the knife edges 13 but would be free to move between the second pair of ends of said members by reason of its engagement by the rollers. The roller 15 as shown in Fig. 5 has an arm 16 projecting from it which first extends toward the disk 3 and is then bent at right angles thereto. This arm has projecting from a point adjacent this bend a spring arm 17 whose end is at about the same distance from the bend as is the end of the arm 16. A spindle 18 is mounted in suitable bearings at the center of the disk 3 so as to project at right angles to its plane and has fixed to its outer end a pointer 19 which projects radially of the disk in position to coöperate with the graduations of the scale thereon. This spindle 18 is operatively connected to the arm 16 by means of a thread or small cord 20 having one or more turns about said spindle and having its ends connected respectively to the outer ends of the arms 16 and 17.

Under conditions of use the pointer 19 is set at the zero of the scale and by pressing the head 12 on the bar 11 toward the disk, the movable member 6 is moved away from the member 5 so that the device may be applied to a test specimen, which will then extend through the substantially circular openings formed by the recesses in the jaws provided by the two pairs of adjacent ends of the members 5 and 6. A release of the pressure on the head 12 will allow the spring 10 to draw the member 6 toward the member 5 with the result that the two edges 13 on one pair of the adjacent ends of these members tightly grip the test specimen, while the rollers 14 and 15 on the second pair of adjacent ends of said members frictionally engage the test piece.

As the latter is subjected to tension, the elongation of its portion $x^1$ causes the part engaged by the rollers 14 and 15 to move relatively to the part gripped by the knife edges 13, with the result that said rollers are turned on their axes and the two arms 16 and 17 attached to the roller 15 are likewise turned through an angle depending on the amount of this movement. As a consequence the cord 20 causes revolution of the spindle 18, moving the pointer 19 over the scale, from which may be directly read the amount of elongation of the test piece to which the movement of the pointer is substantially proportional.

Moreover, by carefully observing the pointer it is possible to note just when the specimen is stretched beyond its elastic limit, since obviously at its yielding point the movement of the pointer is considerably accelerated.

It is thus possible to make a measurement or secure an indication of the elongation of a test specimen within its elastic limit and also beyond its yielding point, one vital advantage of the invention being the ease and rapidity with which it may be attached to or removed from the piece under test, as well as its light, simple and inexpensive construction.

For insuring the return of the pointer to its zero position we may provide a lever 25 fulcrumed on the case or frame 3 at 26 and so mounted that the extremity of its long arm normally engages the arm 16, moving this under the action of a spring 27 into engagement with a stop 28—in which position the pointer 19 is at zero. The short arm of said lever is so formed as to be engaged by a test piece when our device is applied thereto, and so turned on its pivot as to move into the position indicated in dotted lines in which it is wholly free of the arm 16. As soon as the extensometer is removed from the test specimen the spring 27 again moves the lever 25 into engagement with the arm 16—returning the pointer to zero as above described.

Obviously means other than the device shown in Fig. 5 may be employed for operatively connecting the roller 15 and the pointer spindle 18, and for example, as in Fig. 7, we may mount a pinion 30 on said spindle and have it engaged by a segmental rack 31 fixed to the roller.

We claim:—

1. An extensometer consisting of a supporting structure; means including jaws for detachably applying said structure to a test specimen; and means including a pivoted, specimen-engaging member carried by one of said jaws, for indicating changes in the dimensions of the specimen.

2. An extensometer consisting of a supporting structure; two sets of jaws for detachably applying said structure to a test specimen; and mechanism including a pivoted, specimen-engaging member carried by a jaw of one of the sets for indicating changes in the length of the specimen between the sets of jaws.

3. An extensometer consisting of a supporting structure; a set of gripping jaws thereon; a second set of jaws formed to movably engage a test specimen; and mechanism connected with one of the jaws of the second set for indicating changes in the dimensions of the specimen.

4. A supporting structure having a scale; two sets of jaws for detachably connecting the structure to a test specimen, of which one set is adapted to be immovably connected to said specimen; and means actuated when the specimen moves through the other set of the jaws for indicating on the scale the amount of its deformation.

5. An extensometer consisting of a structure having one set of jaws for gripping a test specimen; a second set of jaws for movably engaging the specimen; means for moving one jaw of each set away from the other jaw to permit of the application of the apparatus to a test specimen; and mechanism for indicating the amount of movement of said specimen through the second set of jaws.

6. An extensometer consisting of a scale having two fixed jaws thereon; a structure carrying two other jaws respectively coöperating with the fixed jaws and yieldingly forced toward the same, each movable jaw coöperating with the corresponding fixed jaw to form a set of jaws, one set of the jaws being adapted to be immovably connected to a test specimen; and mechanism coöperating with the scale for indicating variations in the dimensions of that part of the test specimen between the two sets of jaws.

7. An extensometer consisting of a scale having two fixed jaws thereon; a structure carrying two other jaws respectively coöperating with the fixed jaws and yieldingly forced toward the same, each movable jaw coöperating with the corresponding fixed jaw to form a set of jaws, one set of the jaws being adapted to be immovably connected to a test specimen; with mechanism coöperating with the scale for indicating variations in the dimensions of that part of the test specimen between the two sets of jaws; the same including a pointer; and a member carried by one of the jaws for actuating said pointer when the test specimen moves through said jaws.

8. The combination of a supporting structure; two relatively fixed jaws thereon of which one includes a movable member; two relatively movable jaws of which one has a gripping member, and the other has a movable member, each movable jaw coöperating with the corresponding fixed jaw to form a set of jaws, one set of the jaws being adapted to be immovably connected to a test specimen; with indicating mechanism connected to the movable member of one of the fixed jaws for indicating the amount of movement of the test specimen therethrough.

9. An extensometer consisting of a scale; a fixed and a movable jaw carried thereby including a rotatable member formed to engage a test specimen; an arm connected to said member; a pointer coöperating with the scale; and means for operatively connecting the pointer and said arm.

10. The combination of a scale; two relatively fixed jaws thereon of which one is formed to grip and the other to movably engage a test piece; a second pair of jaws respectively coöperating with said first set of jaws and movably mounted on the scale; a spring normally acting to force said jaws together; a pointer coöperating with the scale; and mechanism connected with the pointer for indicating the amount of movement of a test specimen through one pair of jaws.

11. The combination of a supporting structure; two fixed jaws thereon; a movable member mounted on said structure and having jaws respectively coöperating with said fixed jaws; a bar connected to said member; a spring operative on the bar to force said member toward the fixed jaw; a pointer; with an arm operatively connected to said pointer and means for causing said arm to be actuated when the test specimen moves relatively to one of said sets of jaws.

12. An extensometer consisting of an annular structure made in two relatively movable parts respectively provided with recesses in their adjacent ends to provide jaws for the reception of a test piece; a scale carried by said structure; and mechanism coöperating with the scale and including a member formed to engage a test specimen for indicating the amount of movement of the latter relatively to one of said sets of jaws.

13. An extensometer consisting of an annular structure made in two substantially semiannular parts having recesses in their adjacent ends, the edge of one of the recesses being formed to constitute means for gripping a test piece; a member movably mounted adjacent the edge of one of the other recesses; a scale carried by the annular structure; with a pointer coöperating with the scale and operatively connected to said member for indicating changes in the length of a test specimen engaged by said structure.

14. An extensometer consisting of an annular structure made in two substantially semiannular parts having recesses in their adjacent ends; the edge of one of the recesses being formed to constitute means for gripping a test piece; a member movably mounted adjacent the edge of one of the other recesses; a scale carried by the annular structure; a pointer coöperating with the scale and operatively connected to said member for indicating changes in the length of a test specimen engaged by said structure; with means for yieldingly forcing the two parts of the annular structure together.

15. The combination of a scale; a semiannular piece; a second semiannular member movably mounted on the scale; a spring forcing the ends of said latter piece toward those of the first piece; a pointer for the scale; a movable member mounted adjacent one end of the fixed semiannular piece in position to be engaged by a test specimen extending between said pieces; an arm connected to said member; and means operatively connecting said arm with the pointer.

16. The combination in an indicating instrument of a pointer; means acted on by a specimen under test for moving said pointer from its zero position; and an automatic device normally rendered inoperative by the specimen, for returning said pointer to its zero position in the absence of said specimen.

17. The combination in an extensometer of jaws for engaging a test specimen; means including a pointer for indicating changes in the length of said specimen; with an automatic device mounted to be rendered inoperative by a specimen engaged by the jaws and operative to return the pointer to its zero position in the absence of said specimen.

18. The combination in an extensometer of jaws for engaging a test specimen; means including a pointer for indicating changes in the length of said specimen; with a lever mounted to hold the pointer in its zero position and placed to be moved by the test specimen into a position disengaged from the pointer.

19. The combination in an extensometer of jaws engaging a test specimen; means including a pointer for indicating changes in the length of said specimen; a lever having one arm in position to be engaged by a test piece and a second arm formed to engage the pointer when the first arm is not engaging the test piece; with a spring tending to move the second arm toward the pointer.

HARVEY C. HAYES.
GEORGE W. LEWIS.